2,996,369
ZIRCONIUM OXIDE AND PROCESS OF
MAKING THE SAME
William M. Harris, Flemington, N.J., Robert H. Linnell, Burlington, Vt., and William F. Meredith, Princeton, N.J., assignors to Titanium Zirconium Company, Inc., a corporation of New Jersey
No Drawing. Filed Oct. 10, 1958, Ser. No. 766,386
7 Claims. (Cl. 51—309)

This invention relates to a cubic crystalline form of zirconium oxide $ZrO_2$ stable at room temperature but convertible on prolonged heating above the transition temperature to a form which reverts to monoclinic zirconium oxide at room temperatures, and to a process of preparing the same.

Zirconium oxide $ZrO_2$ exists at room temperature in the form of white, yellow or brown monoclinic crystals. The monoclinic crystalline form is unstable above about 1000° C. and undergoes a transformation to the cubic form. The cubic form is unstable below about 1000° C., and undergoes a transformation to the monoclinic form. This inversion is accompanied by a change in volume. The result is that the refractories which must be fired at temperatures above 1000° C. can not be made from monoclinic zirconium oxide because they would be mechanically shattered during heating to the firing temperature.

Zirconium oxide as usually prepared is obtained in monoclinic form. Miller Patent No. 2,392,605, patented January 8, 1946, describes a method of manufacturing zirconium oxide by heating a zirconium ore with carbon and converting the resulting zirconium-carbon-oxygen compounds to zirconium oxide by heating or burning. Similar methods are disclosed in U.S. Patents Nos. 2,110,733, 2,143,013, Reissue No. 21,726 and No. 2,194,426. The zirconium oxide which is obtained in these processes when cooled to room temperature is found to be monoclinic.

Miller Patent No. 2,489,307, patented November 29, 1949, refers to the preparation of highly purified zirconium oxide by controlled precipitation from chemically pure water-soluble salts of zirconium. Zirconium oxide also can be prepared as described in this patent from zircon or zirconium silicate by reduction in the presence of carbon and air with a formation of a complex zirconium cyanonitride. This process is described in U.S. Patent No. 2,270,527, patented January 20, 1942. The zirconium cyanonitride is burned or calcined at an elevated temperature, preferably above 1050° C., to zirconium oxide. The resulting zirconium oxide when cooled to room temperature also is monoclinic, as is stated in Miller Patent No. 2,624,661, which gives the X-ray diffraction patterns of the materials obtained by these processes.

Cubic zirconium oxide which is stable at temperatures below about 1000° C. has been prepared by reacting zirconium oxide with a stabilizer at temperatures above the inversion temperature. The additive normally used is calcium oxide. The stabilizer is thought to enter the cubic lattice of the zirconium oxide, and in some way lock the latter structure so that it is maintained at room temperature. The stabilized cubic zirconium oxide at room temperature gives the X-ray diffraction pattern of cubic zirconium oxide taken at temperatures above 1000° C. without a stabilizer. The X-ray pattern of monoclinic zirconium oxide is distinctive, and would not be confused with the cubic.

In accordance with the instant invention, a cubic crystalline form of zirconium oxide $ZrO_2$ is prepared which is stable at room temperature even though, so far as is presently known, no stabilizing additive is present in the lattice structure. This cubic zirconium oxide, unlike other stabilized cubic zirconium oxides, becomes unstable when heated at temperatures in excess of about 1100° C. When a 100 gram sample is heated at 1200° C. for two hours, and then cooled, it is converted substantially quantitatively to monoclinic zirconium oxide, and this form cannot be distinguished from ordinary monoclinic zirconium oxide.

The conversion is dependent to a considerable extent upon the temperature and the heating time. Conversion will be incomplete if the material is heated at 1200° C. for only a few minutes, or even only one hour. At higher temperatures, however, the conversion is more rapid. The conversion may be incomplete until after the material has been held for some time at temperatures above 1000°C.

It is thought that at the elevated temperature the stable cubic form of zirconium oxide which is the subject of the instant invention is in some way transformed into the unstable ordinary cubic form of zirconium oxide, which then reverts to the monoclinic form upon cooling below the transition temperature of 1000° C.

The stable cubic zirconium oxide of the invention can be prepared by any of several processes. Heating or calcining zirconium carbonate or zirconium hydrous carbonate or zirconium hydrate at a temperature from about 750° C. up to about 1200° C. until the product shows the X-ray diffraction pattern of cubic zirconium oxide is a very satisfactory method. Surprisingly, heating zirconium sulfate or basic zirconium sulfate or zirconium lactate under the same conditions gives the monoclinic form upon cooling to room temperature.

A preferred embodiment of the invention is the cubic zirconium oxide obtained by heating a mixture of zirconium carbonate or zirconium hydrous carbonate or zirconium hydrate with silica, as in the form of silica gel, thus obtaining a stable cubic zirconium oxide which contains a proportion of silica. The silica may enter the cubic lattice of the zirconium oxide. Such a product is particularly useful as a glass polish because of the presence of the silica.

The firing temperature and time are not critical. The firing temperature should not, however, be substantially in excess of 1200° C., since at this temperature the zirconium oxide of the invention is converted rapidly into the unstable form which becomes monoclinic at room temperature. In general, the lower the temperature the longer the time required to develop the characteristic X-ray diffraction pattern of cubic zirconium oxide. At 750 to 800° C., up to twenty-four hours may be required. At 950 to 1050° C., one-half hour to three hours is usually adequate. At 1175 to 1200° C., conversion can be complete in approximately fifteen minutes. The conversion times and temperatures required will be dependent to some extent upon the apparatus and the quantity of material being fired. For the equipment at hand it is convenient to establish the temperature and time precisely by heating samples under various conditions and determining the X-ray diffraction pattern. The cubic X-ray pattern will be diffused and hazy when only fine crystals are present. As the crystals grow larger, the cubic X-ray pattern grows sharper. Conversion to the cubic form is complete when a diffused or hazy pattern is obtained, but if large crystals are desired, the heating will be continued until a sharp X-ray diffraction pattern is obtained at temperatures below 1200° C.

The following examples in the opinion of the inventors represent the best embodiments of their invention.

EXAMPLE 1

A mixture of 397 parts of finely milled zircon ore and 278 parts of soda ash (a ratio of 1 mole $ZrO_2$ to 1.2 moles $Na_2O$) was calcined at about 1000° C. for two hours, at which time reaction was essentially complete. The reaction product was cooled. 4200 parts of the reaction product was slurried with 12,000 parts of water and the liquid was removed by decantation to remove excess alkali and other water-soluble impurities. The decanting was repeated three times, and the final slurry was then treated with 1765 parts of 66° Baumé sulfuric acid. The temperature was kept below 45° C. while the acid was being added. The slurry was continuously agitated until after fifteen minutes it had set to a milk-white gel. The zirconium and silicon in the gel were present as their hydrated oxides. The zirconia corresponded to about 65% by weight of the two oxides.

The gel was dried at 120° C., washed with water to remove most of the sulfate, dehydrated at 850° C., rewashed to substantially sulfate-free condition and finally dried at 120° C.

The dried product was calcined at 1000° C. for one hour. At the end of this time it had developed the characteristic sharp X-ray diffraction pattern of cubic zirconium oxide. The material was perfectly stable at room temperature, and retained this X-ray diffraction pattern for six months without change. When a 100 gram sample was heated to 1200° C., held at this temperature for two hours, and then cooled, it was found to have reverted quantitatively to monoclinic zirconium oxide.

This material was ground to 325 mesh size, and was found to be useful as a glass polish, in which use it displayed exceptional polishing properties. Polishing tests were performed by thoroughly mixing 50 grams of the cubic zirconium oxide in 150 ml. of water and then polishing a weighed glass disc for ten minutes using a standard commercial bowl felt polisher. Water was added during the test to compensate for the evaporation loss and maintain a constant concentration. At the end of the test the glass disc was examined for quality of polish and weighed, the weight loss being the figure of merit in polishing speed. The test was repeated without changing the slurry for several test lenses. The following results were obtained: 111, 130, 139, 153, 168, 169, 175, 186, 189 milligram weight loss. The X-ray diffraction pattern of this material indicated a substantial proportion of cubic zirconium oxide with a small amount of monoclinic zirconium oxide.

These results are exceptional. Commercial stabilized cubic zirconium oxide containing calcium oxide as a stabilizing agent gave the following results in the same test: 65, 80, 95, 116, 128, 137. The X-ray diffraction pattern of this material had very sharp lines, showing large crystals were present. Some monoclinic zirconium oxide was present, but by far the greater proportion was cubic.

The cubic zirconium oxide of the invention also is superior as a glass polish to ordinary monoclinic zirconium oxide. Such materials when tested by the standard polishing test described above gives values ranging from 80 to 100 maximum.

In order to further demonstrate the significance of conversion of the zirconium oxide-silica mixture to cubic form, a further sample was prepared and calcined at 830° C. for three hours. At the conclusion of this heating the X-ray diffraction pattern was taken, and showed the zirconium oxide to be substantially entirely monoclinic in form. Thus, the heating time was too brief to effect conversion to the stable cubic form. When tested by the polishing test, the following values were obtained: 96, 102, 103, 101, 101, 99. This material reached a maximum in the third test and then began to decrease in efficiency, whereas the stable cubic form of the invention had a much higher initial polishing value, and continued to increase in efficiency throughout the test.

The glass polishing test results tend to confirm the differences in the Z-ray diffraction patterns between cubic and monoclinic zirconium oxides, and show that the stable cubic form of the invention is superior to monoclinic. They further tend to distinguish between the stable cubic form of the invention and ordinary cubic zirconium oxide stabilized with an additive such as calcium oxide. Although the X-ray diffraction patterns of the two samples tested were substantially identical, the glass polishing test results were significantly different. This tends to show that a difference exists between the crystals of the stable cubic zirconium oxide of the invention and the stabilized cubic zirconium oxide of the prior art. It is apparent that it is important not only to have the zirconium oxide in cubic form, but also to have it in the cubic form of the invention.

EXAMPLE 2

A mixture of 397 parts of finely milled zircon ore and 278 parts of soda ash (corresponding to approximately 1.25 moles of sodium oxide to 1 mole of zirconia) was heated at about 1000° C. until reaction was essentially complete.

The chemical reaction with the limited proportion of soda ash used (namely 1 mole of the reasonable excess shown to allow for possible incompleteness of reaction) may be written as follows:

$$Na_2O \cdot CO_2 + ZrO_2 \cdot SiO_2 \rightarrow Na_2O \cdot ZrO_2 \cdot SiO_2 + CO_2$$

or

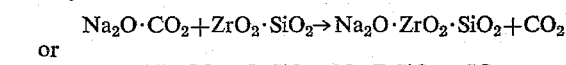

$$Na_2CO_3 + ZrSiO_4 \rightarrow Na_2ZrSiO_5 + CO_2$$

200 parts of the reaction product was intimately mixed with 265 parts of 66° Baumé sulfuric acid. The reaction gave a white powder composed of a mixture of sodium sulfate, zirconium sulfate and silica powder. The zirconium sulfate was separated from the silica powder by leaching with water without allowing the water to remain in contact with the mass for longer than necessary to dissolve the zirconium sulfate, so as to avoid gelatinization of the silica by the water to form a gel. The undissolved material was separated from the zirconium sulfate solution by filtration.

1110 parts of this solution of zirconium sulfate, containing 345 parts of zirconium calculated as zirconium oxide, was agitated and aqueous caustic soda added until the pH was 9. The resulting insoluble zirconium hydroxide was separated by filtration and washed with water. The pressed cake was calcined at 900° C. for three hours. At the end of this time the X-ray diffraction pattern showed that the zirconium oxide was in cubic form, and the pattern was very diffuse, indicating extremely small crystals. The results of the glass polishing test on this material were: 94, 97, 95, 92, 84, 83. These results show that the crystal size was too small for optimum glass polishing properties. However, the material was used to make refractories which did not shatter before or during firing.

Another portion of zirconium hydroxide prepared as set forth above was calcined for twenty-one hours at 900° C. The product gave an X-ray diffraction pattern characteristic of cubic zirconium oxide not quite so sharp as that of Example 1. The material was ground to 325 mesh size. The following polishing results were obtained: 120, 130, 137, 138, 140, 132. The glass polishing results were satisfactory, but suggest that the crystal size was not as large as that of the sample of Example 1, which conclusion is confirmed by the difference in the X-ray diffraction pattern.

Both the above materials reverted to monoclinic zirconium oxide when heated at 1200° C. for two hours and cooling.

EXAMPLES 3 to 11

(a) Preparation of zirconium carbonate 400 parts of commercial soda ash ($Na_2CO_3$) was put in 1600 parts of water and agitated until well dissolved. To this solution was added 5800 parts of a solution of zirconium sulfate containing 241 parts of zirconium calculated as zirconium oxide and prepared as set forth in Example 2. Insoluble zirconium carbonate precipitated at a final pH of 4.8, and this precipitate was found to be substantially free from zirconium hydroxide, as shown by the complete solubility of a sample in acetic acid. The zirconium carbonate so precipitated was separated by filtration and washed with water. The resultant filter cake was divided into several portions.

(b) *Preparation of zirconium hydroxide*

1100 parts of a solution of zirconium sulfate prepared as set forth in Example 2 was agitated and aqueous ammonia added until the pH was 9. The resulting insoluble zirconium hydroxide was separated by filtration and washed with water.

In a variation of this procedure, the zirconium hydroxide was precipitated from the zirconium sulfate solution by adding aqueous caustic soda until the pH was 9. The resulting insoluble zirconium hydroxide was separated by filtration and washed with water as before.

These products were calcined at the temperatures indicated below in the table. The calcined products were disintegrated by passing through a 325 mesh screen, and were tested for polishing effectiveness, with the results shown in the table.

TABLE I

| Example No. and Starting Compound | Calcination Temp., °C. | Glass Removed (mg. in 10 min.) | X-Ray Diffraction Pattern of Zirconium Oxide |
|---|---|---|---|
| 3. Zirconium hydroxide (NH₃ pptd.). | 900 (30 min.). | 93 | Monoclinic. |
| 4. Zirconium hydroxide (NaOH pptd.). | 900 (1 hour). | 93 | Do. |
| 5. Zirconium carbonate | 800 (3 hours). | 168, 167, 166, 167, 158, 155, 146. | Cubic. |
| 6. Zirconium carbonate | 900 (3 hours). | 159 | Sharp cubic. |
| 7. Zirconium carbonate | 950 | 160 | Do. |
| 8. Zirconium carbonate | 1,000 | 154, 158, 160, 162, 165, 163, 168. | Do. |
| 9. Zirconium carbonate | 1,050 | 110 | Do. |
| 10. Zirconium carbonate | 1,200 (15 min.). | 172, 169, 170, 163, 167, 166, 164, 157. | Cubic, small amount of monoclinic. |
| 11. Zirconium carbonate | 1,200 (2 hours). | 76, 79, 84, 76, 91, 92. | Monoclinic. |
| Commercial Materials: | | | |
| Cerium oxide, Commercial Type A. | | 129 | |
| Cerium oxide, Commercial Type B. | | 140 | |
| Cerium oxide, Commercial Type C. | | 155 | |
| Zirconium oxide, Commercial, Electric Furnace Product. | | 94 | Do. |

The influence of heating time at the conversion temperature is evident. Examples 3 and 4 were not heated long enough to effect conversion. Examples 10 and 11 together show that at the transition temperature of 1200° C., too long heating converts the stable cubic form of the invention into the unstable form which reverts to monoclinic.

The superiority of the cubic zirconium oxide of the invention to the monoclinic form and to cerium oxide in glass polishing is clear from the data for Examples 5 to 10, inclusive.

All of the cubic zirconium oxides prepared as described above reverted to monoclinic after heating at 1200° C. for two hours and cooling.

EXAMPLE 12

A sample of zirconium carbonate prepared according to Examples 3 to 11a was calcined at 1200° C. for fifteen minutes. The product had the sharp X-ray pattern of cubic zirconium oxide, with a small amount of monoclinic, and the glass polishing test data was 172, 169, 170, 163, 167, 166, 164, 157 mg. When heated at 1200° C. for two hours and cooled, the product reverted entirely to monoclinic, and the glass polishing test data was 76, 79, 84, 76, 91, 92, 96, 93 mg.

EXAMPLE 13

A sample of hydrous zirconium carbonate prepared as set forth in Examples 3 to 11a was calcined at 950° C. for three hours. The product had the sharp X-ray diffraction pattern of cubic zirconium oxide with a small amount of monoclinic and reverted to monoclinic after heating at 1200° C. for two hours and cooling. Glass polishing test data results were as follows: 148, 165, 165, 171, 169, 165 mg.

The cubic zirconium oxide of the invention has highly desirable physical properties. It is accordingly suitable not only for the uses to which zirconium oxide customarily is put, such as an opacifier for vitreous enamels, but it also has exceptional properties as a glass polishing agent. Because it is already in cubic form, it does not undergo a change in volume when refractories containing it are heated to the firing temperature, with the result that they are not shattered as would be the case where monoclinic zirconium oxide is employed.

This application is a continuation-in-part of application Serial No. 727,543, filed April 10, 1958, and now abandoned.

We claim:

1. Cubic zirconium oxide consisting essentially of zirconium oxide, stable at room temperature and unstable at 1200° C. and above, being convertible to monoclinic zirconium oxide by heating at 1200° C. for two hours and then cooling to room temperature.

2. Cubic zirconium oxide consisting essentially of zirconium oxide and silica, stable at room temperature and unstable at 1200° C. and above, being convertible to monoclinic zirconium oxide by heating at 1200° C. for two hours and then cooling to room temperature, the silica being in a proportion to form cubic zirconium oxide useful as a glass polish.

3. A process of preparing a cubic zirconium oxide which comprises heating a zirconium compound selected from the group consisting of zirconium carbonate, zirconium hydrate and zirconium hydrous carbonate at an elevated temperature not in excess of 1200° C. until a cubic zirconium oxide is obtained which is stable at room temperature and unstable at 1200° C. and above, being convertible to monoclinic zirconium oxide by heating at 1200° C. for two hours and then cooling to room temperature.

4. A process of preparing a cubic zirconium oxide which comprises heating a mixture of silica and a zirconium compound selected from the group consisting of zirconium carbonate, zirconium hydrate and zirconium hydrous carbonate at an elevated temperature not in excess of 1200° C. until a cubic zirconium oxide is obtained which is stable at room temperature and unstable at 1200° C. and above, being convertible to monoclinic zirconium oxide by heating at 1200° C. for two hours and then cooling to room temperature, the silica being in a proportion sufficient to form cubic zirconium oxide useful as a glass polish.

5. A process in accordance with claim 4 in which the zirconium compound is zirconium carbonate.

6. A process in accordance with claim 4 in which the zirconium compound is zirconium hydrate.

7. A process in accordance with claim 4 in which the zirconium compound is zirconium hydrous carbonate.

References Cited in the file of this patent

UNITED STATES PATENTS

| 2,578,748 | Schoenlaub | Dec. 18, 1951 |
| 2,721,115 | Shoenlaub | Oct. 18, 1955 |
| 2,769,699 | Polch | Nov. 6, 1956 |

OTHER REFERENCES

Mellor: "Comprehensive Treatise on Inorganic and Theoretical Chemistry," Longmans, Green & Co., New York, vol. VII, page 124 (1927).